US012671540B2

(12) United States Patent
Wu

(10) Patent No.: US 12,671,540 B2
(45) Date of Patent: Jun. 30, 2026

(54) TERMINAL DEVICE AND NETWORK DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 309 days.

(21) Appl. No.: 18/474,930

(22) Filed: Sep. 26, 2023

(65) Prior Publication Data

US 2024/0031092 A1    Jan. 25, 2024

Related U.S. Application Data

(63) Continuation of application No. PCT/CN2021/085473, filed on Apr. 2, 2021.

(51) Int. Cl.
H04L 5/00 (2006.01)
H04W 72/20 (2023.01)

(52) U.S. Cl.
CPC .......... H04L 5/0048 (2013.01); H04L 5/0053 (2013.01); H04L 5/0094 (2013.01); H04W 72/20 (2023.01)

(58) Field of Classification Search
CPC ... H04L 5/0048; H04L 5/0053; H04L 5/0094; H04W 72/20
See application file for complete search history.

(56) References Cited

U.S. PATENT DOCUMENTS

| | | | | |
|---|---|---|---|---|
| 2020/0169991 | A1* | 5/2020 | Lin | H04W 72/56 |
| 2020/0228196 | A1* | 7/2020 | John Wilson | H04W 72/23 |
| 2020/0288472 | A1* | 9/2020 | Chen | H04W 72/20 |
| 2020/0288479 | A1 | 9/2020 | Xi et al. | |
| 2021/0105100 | A1* | 4/2021 | Zhou | H04B 7/0695 |
| 2021/0175937 | A1* | 6/2021 | Yamada | H04B 7/088 |

(Continued)

FOREIGN PATENT DOCUMENTS

| | | |
|---|---|---|
| CN | 108633007 | 10/2018 |
| CN | 109560904 | 4/2019 |

(Continued)

OTHER PUBLICATIONS

3GPP TSG-RAN WG1 Meeting#99, R1-1913006 Title:Draft CR on correcting higher layer parameter for CORESET (Year: 2019).*

(Continued)

*Primary Examiner* — Faruk Hamza
*Assistant Examiner* — Abusayeed M Haque
(74) *Attorney, Agent, or Firm* — Hodgson Russ LLP

(57) ABSTRACT

Provided are a terminal device and a network device. A terminal device includes a transceiver; a processor; and a memory storing computer programs which, when executed by the processor, are operable with the processor to: cause the transceiver to receive first control information, where the first control information is used for scheduling one or more physical channels; determine a quasi-co-location (QCL) reference for the one or more physical channels according to at least one of a preset rule, the first control information, or first configuration information.

19 Claims, 6 Drawing Sheets

<u>200</u>

TERMINAL DEVICE RECEIVES FIRST CONTROL INFORMATION, WHERE THE FIRST CONTROL INFORMATION IS USED FOR SCHEDULING ONE OR MORE PHYSICAL CHANNELS — S210

TERMINAL DEVICE DETERMINES A QCL REFERENCE FOR THE ONE OR MORE PHYSICAL CHANNELS ACCORDING TO AT LEAST ONE OF A PRESET RULE, THE FIRST CONTROL INFORMATION, OR THE FIRST CONFIGURATION INFORMATION — S220

(56) References Cited

U.S. PATENT DOCUMENTS

| | | | | |
|---|---|---|---|---|
| 2021/0409094 A1* | 12/2021 | Yuan | .................... | H04W 76/19 |
| 2023/0033910 A1* | 2/2023 | Khoshnevisan | ...... | H04L 5/0048 |

FOREIGN PATENT DOCUMENTS

| | | | | |
|---|---|---|---|---|
| CN | 110535545 | | 12/2019 | |
| CN | 110536423 | | 12/2019 | |
| CN | 110719632 | * 1/2020 | ........ | H04W 72/0453 |
| WO | 2020093396 | | 5/2020 | |

OTHER PUBLICATIONS

"3rd Generation Partnership Project; Technical Specification Group Services and System Aspects; Vocabulary for 3GPP Specifications (Release 16)," 3GPP TR 21.905, Jun. 2019, v16.0.0.

Interdigital, Inc., "Discussion summary #4 of [104-e-NR-52-71GHz-04]," 3GPP TSG RAN WG1 #104-e, R1-2102144, Jan. 2021.

WIPO, International Search Report and Written Opinion for International Application No. PCT/CN2021/085473, Jan. 4, 2022.

ZTE, "Considerations on beam management for multi-TRP," 3GPP TSG RAN WG1 #97, R1-1906244, May 2019.

Intel Corporation, "Summary for simultaneous Tx and Rx of channels and RS," 3GPP TSG RAN WG1 Meeting #95, R1-1813896, Nov. 2018.

EPO, Extended European Search Report for EP Application No. 21934139.3, Apr. 29, 2024.

* cited by examiner

200

| TERMINAL DEVICE RECEIVES FIRST CONTROL INFORMATION, WHERE THE FIRST CONTROL INFORMATION IS USED FOR SCHEDULING ONE OR MORE PHYSICAL CHANNELS | S210 |
|---|---|

| TERMINAL DEVICE DETERMINES A QCL REFERENCE FOR THE ONE OR MORE PHYSICAL CHANNELS ACCORDING TO AT LEAST ONE OF A PRESET RULE, THE FIRST CONTROL INFORMATION, OR THE FIRST CONFIGURATION INFORMATION | S220 |
|---|---|

300

TERMINAL DEVICE DOES NOT TRANSMIT ON SIXTH TIME-DOMAIN RESOURCE, WHEN THIRD QCL REFERENCE CORRESPONDING TO FOURTH TIME-DOMAIN RESOURCE IS DIFFERENT FROM FOURTH QCL REFERENCE CORRESPONDING TO FIFTH TIME-DOMAIN RESOURCE — S310

NETWORK DEVICE SENDS FIRST CONTROL INFORMATION FOR SCHEDULING ONE OR MORE PHYSICAL CHANNELS, SO THAT TERMINAL DEVICE DETERMINES QCL REFERENCES FOR ONE OR MORE PHYSICAL CHANNELS ACCORDING TO AT LEAST ONE OF PRESET RULE, FIRST CONTROL INFORMATION, OR FIRST CONFIGURATION INFORMATION — S410

FIG. 7

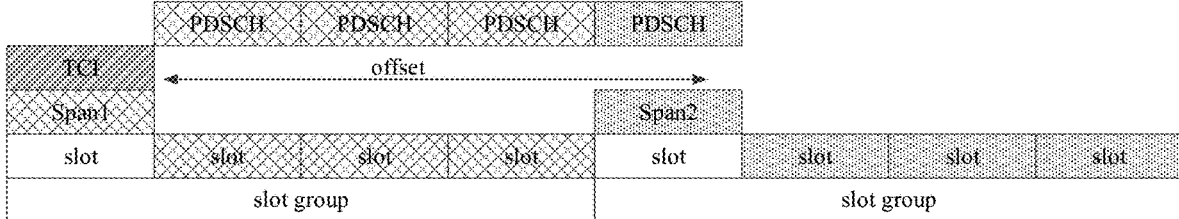

FIG. 8

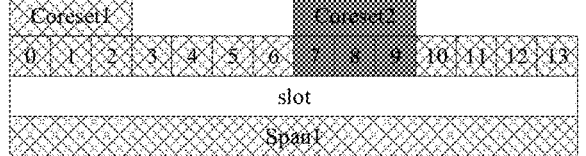 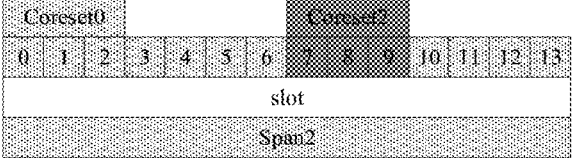

FIG. 9

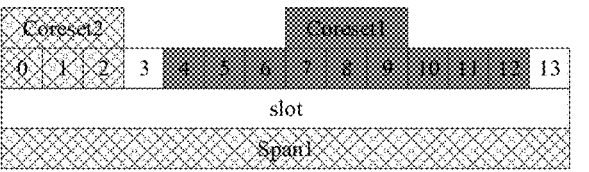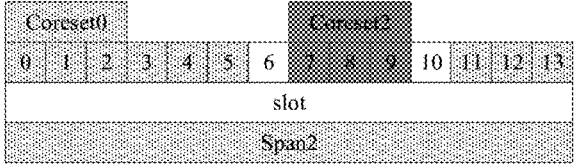
FIG. 15
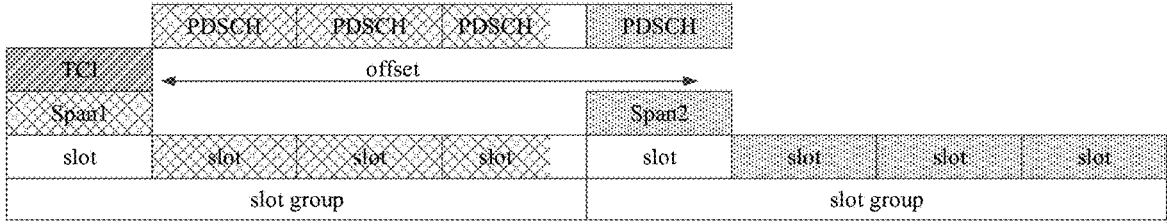
FIG. 16
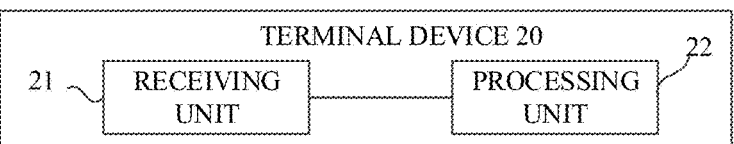
FIG. 17
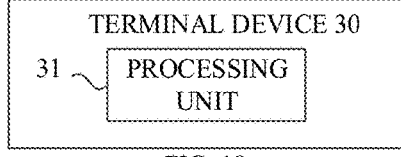
FIG. 18
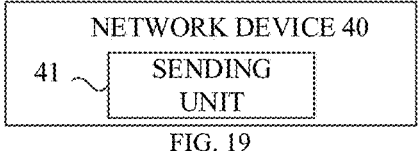
FIG. 19

TERMINAL DEVICE AND NETWORK DEVICE

CROSS-REFERENCE TO RELATED APPLICATION(S)

This application is a continuation of PCT Application No. PCT/CN2021/085473, filed Apr. 2, 2021, the entire disclosure of which is hereby incorporated by reference.

TECHNICAL FIELD

This application relates to the field of communication, and in particular, to terminal devices and a network device.

BACKGROUND

In a new radio (NR) system, quasi co-location (QCL) refers to that a large-scale parameter of a channel over which a symbol on one antenna port is conveyed can be inferred from a channel over which a symbol on another antenna port is conveyed. In high-frequency data transmission, due to large channel fading, beamforming is required to improve the data transmission efficiency. In a high-frequency scenario, how to determine a QCL relationship between different physical channels needs to be considered.

SUMMARY

Provided in embodiments of the disclosure is a terminal device. The terminal device includes a transceiver, a processor, and a memory storing computer programs which, when executed by the processor, are operable with the processor to: cause the transceiver to receive first control information, where the first control information is used for scheduling one or more physical channel; determine a quasi-co-location (QCL) reference for the one or more physical channels according to at least one of a preset rule, the first control information, or first configuration information.

Provided in embodiments of the disclosure is a terminal device. The terminal device includes a transceiver, a processor, and a memory storing computer programs which, when executed by the processor, are operable with the processor to: cause the transceiver to drop transmitting on a third time-domain resource, in a case where a first QCL reference corresponding to a first time-domain resource is different from a second QCL reference corresponding to a second time-domain resource, where the third time-domain resource includes at least one of the following. The third time-domain resource is a time-domain resource between the first time-domain resource and the second time-domain resource; the third time-domain resource is a part or all of time-domain resources in the first time-domain resource; the third time-domain resource is a part or all of time-domain resources in the second time-domain resource.

Provided in embodiments of the disclosure is a network device. The network device includes a transceiver; a processor; and a memory storing computer programs which, when executed by the processor, are operable with the processor to: send first control information for scheduling one or more physical channels, so that a terminal device determines a QCL reference for the one or more physical channels according to at least one of a preset rule, the first control information, or first configuration information.

BRIEF DESCRIPTION OF THE DRAWINGS

FIG. 6 is a schematic flowchart of a wireless communication method of an embodiment of the disclosure.

FIG. 7 is a schematic flowchart of a wireless communication method of an embodiment of the disclosure.

FIG. 8 is a schematic diagram of caching data according to a QCL reference corresponding to the first one of CORESETs in a slot group.

FIG. 9 is a schematic diagram of caching data according to a QCL reference corresponding to a CORESET with the smallest CORESET ID in a slot group.

FIG. 15 is a diagram of a reserved gap for beam switching.

FIG. 16 is a diagram illustrating the effect of the reserved gap on PDSCH transmission.

FIG. 17 is a schematic block diagram of a terminal device according to an embodiment of the disclosure.

FIG. 18 is a schematic block diagram of a terminal device according to an embodiment of the disclosure.

FIG. 19 is a schematic block diagram of a network device according to an embodiment of the disclosure.

DETAILED DESCRIPTION

The following describes technical solutions in embodiments of the disclosure with reference to the accompanying drawings in the embodiments of the disclosure.

Figure 1:
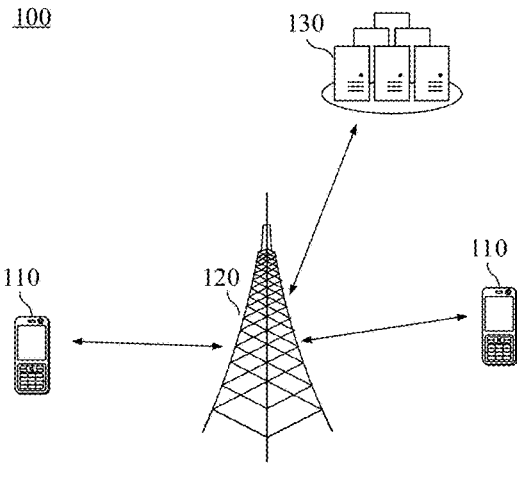
FIG. 1 is a schematic diagram of an application scenario according to an embodiment of the disclosure.

FIG. 1 is a schematic diagram of an application scenario according to an embodiment of the disclosure.

As illustrated in FIG. 1, the communication system 100 may include a terminal device 110 and a network device 120. The network device 120 may communicate with the terminal device 110 over an air interface. Multi-service transmission between the terminal device 110 and the network device 120 is supported.

It should be understood that, the embodiments of the disclosure are merely described exemplarily with the communication system 100, but the embodiments of the disclosure are not limited thereto. That is to say, the technical solution of the embodiments of the disclosure can be applied to various communication systems, for example, a long term evolution (LTE) system, LTE time division duplex (TDD), a universal mobile telecommunication system (UMTS), an internet of things (IoT) system, a narrow band internet of things (NB-IoT) system, an enhanced machine-type communication (eMTC) system, a 5G communication system (also referred to as a new radio (NR) communication system), or a future communication system, etc.

In the communication system 100 illustrated in FIG. 1, the network device 120 may be an access network device that communicates with the terminal device 110. The access network device may provide communication coverage for a particular geographic area, and may communicate with terminal devices 110 (e. g., user equipment (UE)) located within that coverage area.

The network device 120 may be an evolutional Node B (eNB or eNodeB) in the LTE system, or a next generation radio access network (NG RAN) device, or a base station (gNB) in an NR system, or a wireless controller in a cloud radio access network (CRAN), or the network device 120 may be a relay station, an access point, an in-vehicle device, a wearable device, a hub, a switch, a bridge, or a router, or a network device in a future evolved public land mobile network (PLMN).

The terminal device 110 may be any terminal device, which includes, but not limited to, a terminal device in wired or wireless connection with the network device 120 or other terminal devices.

For example, the terminal device 110 may refer to an access terminal, a UE, a subscriber unit, a subscriber station, a mobile station, a remote station, a remote terminal, a mobile device, a user terminal, a terminal, a wireless communication device, a user agent, or a user device. The access terminal may be a cellular telephone, a cordless telephone, a session initiation protocol (SIP) phone, an IoT device, a satellite handset, a wireless local loop (WLL) station, a personal digital assistant (PDA), a handheld device having a wireless communication function, a computing device or other processing device connected to a wireless modem, an in-vehicle device, a wearable device, a terminal device in a 5G network or a terminal device in a future evolution network, or the like.

The terminal device 110 may be used for device-to-device (D2D) communication.

The wireless communication system 100 may also include a core network device 130 communicating with a base station, and the core network device 130 may be a 5G core (5GC) device, such as an access and mobility management function (AMF), an authentication server function (AUSF), a user plane function (UPF), or a session management function (SMF). Optionally, the core network device 130 may also be an evolved packet core (EPC) device in the LTE network, for example, a session management function+core packet gateway device of the core network (SMF+PGW-C). It should be understood that, the SMF+PGW-C may implement functions implemented by the SMF and the PGW-C simultaneously. In the process of network evolution, the foregoing core network device may also be under other names, or a new network entity may be formed as a result of functional division of the core network, which is not limited in embodiments of the disclosure.

The functional units in the communication system 100 may also establish connections through a next generation (NG) interface to realize communication.

For example, a terminal device establishes an air interface connection with an access network device via an NR interface, to transmit user plane data and control plane signaling. A terminal device can establish a control plane signaling connection with an AMF via NG interface 1 ("N1" for short). An access network device, such as a next generation wireless access base station (gNB), can establish a user plane data connection with a UPF via NG interface 3 ("N3" for short). An access network device can establish a control plane signaling connection with an AMF via NG interface 2 ("N2" for short). A UPF can establish a control plane signaling connection with an SMF via NG interface 4 ("N4" for short). A UPF can exchange user plane data with a data network via NG interface 6 ("N6" for short). An AMF can establish a control plane signaling connection with an SMF via NG interface 11 ("N11" for short). An SMF can establish a control plane signaling connection with a PCF through NG interface 7 ("N7" for short).

FIG. 1 exemplarily illustrates one base station, one core network device, and two terminal devices. Optionally, the wireless communication system 100 may include multiple base station devices, and other number of terminal devices may be located in the coverage area of each base station, which is not limited in embodiments of the disclosure.

It should be understood that, in this specification, the terms "system" and "network" are generally used interchangeably. The term "and/or" is only an association relationship for describing associated objects, and indicates that three relationships may exist. For example, "A and/or B" may indicate three cases: A exists separately, A and B exist simultaneously, and B exists separately. In addition, the character "/" in this description generally indicates that the associated objects are in an "or" relationship.

It should be understood that, the "indication" mentioned in embodiments of the disclosure may be a direct indication, an indirect indication, or representing an association. For example, A indicates B, which may indicate that A directly indicates B, for example, B may be acquired through A; or A indirectly indicates B, for example, A indicates C, and B may be acquired through C; it can also represent that there is an association relationship between A and B.

In the description of the embodiments of the disclosure, the term "corresponding" may indicate that there is a direct correspondence or an indirect correspondence between the two, may also indicate that there is an association between the two, and may also be a relationship such as indicating and being indicated, configuring and being configured.

In order to facilitate understanding of the technical solutions of the embodiments of the disclosure, the following describes the related technical solutions of the embodiments of the disclosure. The following related technical solutions as optional solutions may be arbitrarily combined with the technical solutions of the embodiments of the disclosure, and all belong to the scope of protection of the embodiments of the disclosure.

1. High-Frequency Related Content

Currently, two frequency ranges, frequency range 1 (FR1) and frequency range 2 (FR2), are mainly considered in the research of the NR system, where frequency domain ranges included by FR1 and FR2 are illustrated in Table 1.

TABLE 1

| Frequency range definitions | |
| --- | --- |
| Frequency range definition | Frequency range |
| FR1 | 410 MHz-7.125 GHz |
| FR2 | 24.25 GHz-52.6 GHz |

With the evolution of the NR system, a new frequency range, that is, a high-frequency technology, starts to be studied, and a frequency domain range included in the new frequency range is as illustrated in Table 2. For ease of description, in this application, FRX is used to represent the new frequency range, and it should be understood that the name of the frequency range shall not be construed as any limitation. For example, FRX may be FR3.

TABLE 2

| New frequency range | |
| --- | --- |
| Frequency range definition | Frequency range |
| FRX | 52.6 GHz-71 GHz |

The FRX range includes a licensed spectrum and an unlicensed spectrum, or the FRX range includes a non-shared spectrum and a shared spectrum.

Unlicensed spectrum is spectrum assigned by a country and region that can be used for radio device communication, which is commonly referred to as shared spectrum. That is, communication devices in different communication systems can use the frequency spectrum as long as the requirements of regulations set in the country or region on the frequency spectrum are met, and there is no need to apply for a dedicated frequency spectrum license from the government.

In order for various communication systems that communicate wirelessly using unlicensed spectrum to coexist in a friendly manner over the spectrum, some countries or regions have regulations that must be met when using unauthorized spectrum. For example, a communication device follows the principle of "listen before talk (LBT)", that is, before a communication device performs signal transmission on a channel of an unlicensed spectrum, the communication device needs to monitor the channel first, and the communication device can perform signal transmission only when the channel is idle. If the monitor result of the communication device on the channel of the unlicensed spectrum is that the channel is busy, the communication device cannot send a signal. For another example, in order to ensure fairness, in one transmission, a duration for which a communication device uses a channel of an unlicensed spectrum to perform signal transmission cannot exceed a certain time length. For another example, in order to prevent the power of a signal transmitted on a channel of an unlicensed spectrum from being too high and affecting the transmission of other important signals on the channel, a limit of maximum power spectral density shall not be exceeded when the communication device uses an unlicensed spectrum for signal transmission.

The subcarrier spacing considered in FRX range may be larger than the subcarrier spacing of FR2, and the current candidate subcarrier spacing includes at least one of the following: 240 kHz, 480 kHz, and 960 kHz. As an example, the parameter sets (Numerology) corresponding these candidate subcarrier spacing are illustrated in Table 3 below.

TABLE 3

| Numerology corresponding to candidate subcarrier spacing | | | | | |
| --- | --- | --- | --- | --- | --- |
| Subcarrier spacing | Symbol length | NCP length | ECP length | Symbol + NCP length | Slot length |
| 240 kHz | 4.16 μs | 0.292 μs | 1.04 μs | 4.452 μs | 62.5 μs |
| 480 kHz | 2.08 μs | 0.146 μs | 0.52 μs | 2.226 μs | 31.25 μs |
| 960 kHz | 1.04 μs | 0.073 μs | 0.26 μs | 1.113 μs | 15.625 μs |

"NCP" in the table refers to a normal cyclic prefix, and "ECP" refers to an extended cyclic prefix.

2. Quasi-Co-Location (QCL) Relationships in the NR System

QCL means that the large-scale parameter of a channel over which a symbol on one antenna port is conveyed can be inferred from a channel over which a symbol on another antenna port is conveyed. The large scale parameter may include delay spread, average delay, Doppler spread, Doppler shift, average gain, and spatial Rx parameter.

In the NR system, considering possible QCL relationships between various reference signals, the described several large-scale parameters of a channel can be classified into different QCL types, so that the system can configure according to different scenarios of a terminal device. The definitions of different QCL type configurations are as follows:

QCL-TypeA: {Doppler shift, Doppler spread, average delay, delay spread};
QCL-TypeB: {Doppler shift, Doppler spread};
QCL-TypeC: {Doppler shift, average delay};
QCL-TypeD: {Spatial Rx parameter}.

Before a radio resource control (RRC) signaling configuration (for example, in an initial access stage), the terminal device has a system default QCL relationship from a synchronization signal and physical broadcast channel (PBCH) block (SSB) to a demodulation reference signal (DMRS). The terminal device can acquire a Doppler shift, a Doppler spread, an average delay, a delay spread, and a spatial Rx parameter of a channel from an SSB signal according to a QCL relationship between an SSB and a DMRS, so as to adjust a filtering parameter of a DMRS channel estimator, thereby receiving a physical downlink control channel (PDCCH) and a physical downlink shared channel (PDSCH). The spatial Rx parameter is only used for a frequency range above 6 GHz, and the QCL relationship between the SSB and the DMRS can be expressed as follows.

SSB→DMRS, including Doppler shift, Doppler spread, average delay, delay spread and spatial Rx parameter, where the spatial Rx parameter is only used for a frequency range above 6 GHz.

For a frequency range below 6 GHz, after RRC signaling configuration (for example, in an RRC connected status), a QCL relationship between reference signals includes at least one of the following.

SSB→tracking reference signal (TRS), including Doppler shift and average delay; or corresponding to QCL-TypeC.

TRS→channel state information reference signal (CSI-RS) for channel state information (CSI), including Doppler shift, Doppler spread, average delay, and delay spread; or corresponding to QCL-Type A.

TRS→DMRS, including Doppler shift, Doppler spread, average delay, and delay spread; or corresponding to QCL-Type A.

TRS→CSI-RS for CSI, including Doppler shift and Doppler spread; or corresponding to QCL-Type B.

CSI-RS→DMRS, including Doppler shift, Doppler spread, average delay, and delay spread; or corresponding to QCL-Type A.

For a frequency range above 6 GHz, after RRC signaling configuration (for example, the RRC connected status), a QCL relationship between reference signals includes at least one of the following.

SSB→TRS, including Doppler shift, average delay, and spatial Rx parameter; or corresponding to QCL-TypeC+QCL-TypeD.

TRS→CSI-RS for beam management (BM), including Doppler shift, Doppler spread, average delay and delay spread; or corresponding to QCL-TypeA+QCL-TypeD.

TRS→CSI-RS for CSI, including Doppler shift, Doppler spread, average delay, and delay spread; or corresponding to QCL-Type A.

TRS→DMRS for PDCCH, including Doppler shift, Doppler spread, average delay, and delay spread; or corresponding to QCL-TypeA+QCL-TypeD.

TRS→DMRS for PDSCH, including Doppler shift, Doppler spread, average delay, and delay spread; or corresponding to QCL-TypeA+QCL-TypeD.

SSB→CSI-RS for BM, including Doppler shift, average delay, and spatial Rx parameter; or corresponding to QCL-TypeC+QCL-TypeD.

SSB→CSI-RS for CSI, including spatial Rx parameter; or corresponding to QCL-TypeD.

SSB→DMRS for PDCCH (before TRS configuration), including Doppler shift, Doppler spread, average delay, delay spread, and spatial Rx parameter; or corresponding to QCL-TypeA+QCL-TypeD.

SSB→DMRS for PDSCH (before TRS configuration), including Doppler shift, Doppler spread, average delay, delay spread, and spatial Rx parameter; or corresponding to QCL-TypeA+QCL-TypeD.

CSI-RS for BM→DMRS for PDCCH, including spatial Rx parameter; or corresponding to QCL-TypeD.

CSI-RS for BM→DMRS for PDSCH, including spatial Rx parameter; or corresponding to QCL-TypeD.

CSI-RS for CSI→DMRS for PDSCH, including Doppler shift, Doppler spread, average delay, delay spread, and spatial Rx parameter; or corresponding to QCL-TypeA+QCL-TypeD, where the QCL parameter cannot be obtained directly from the CSI-RS for CSI.

CSI-RS for BM→CSI-RS for TRS/BM/CSI, including spatial Rx parameter; or corresponding to QCL-TypeD.

For different types of reference signals, acquisition of the QCL reference includes the following.

Configured via RRC, for example, periodic CSI-RS or TRS.

Configured via RRC and activated via a medium access control control-element (MAC CE) (or "MAC CE-based indication" for short), for example, activate or deactivate a periodic CSI-RS or TRS, or DMRS of PDCCH via MAC CE indication.

Configured via RRC and activated via an MAC CE, indicated by downlink control information (DCI) (or "DCI-based indication" for short), for example, an aperiodic CSI-RS or TRS, or a DMRS of a PDSCH.

It should be noted that the QCL reference for DMRS of PDSCH may also be configured through RRC and activated via MAC CE.

Configured via RRC including: QCL information is included in RRC configuration, and the QCL information is used for determining a QCL reference for a target reference signal.

The above MAC-CE-based indication includes: a set of transmission configuration indicator (TCI) states are configured through RRC, and each TCI state corresponds to one QCL reference. One TCI state is selected from the set of TCI states via MAC CE, and is taken as the QCL reference for the target reference signal.

The above DCI-based indication includes: M TCI states are configured via RRC, and each TCI state corresponds to one QCL reference. A maximum of 8 TCI states is selected from the M TCI states via MAC CE to correspond to 3-bit TCI information in the DCI. If the value of M is less than or equal to 8, the M TCI states correspond to the TCI information in the DCI. One TCI state is selected from the TCI states corresponding to the TCI information in the DCI via DCI, and is taken as the QCL reference for the target reference signal.

The TCI states contain information of the QCL reference, and each TCI state can include at most two downlink reference signals, which serve as at most two types of reference sources, respectively. Specifically, a TCI state identifier (ID) is for identifying a TCI state.

QCL information 1.

QCL information 2.

One piece of QCL information includes the following information.

QCL type configuration, which may be one of QCL type A, QCL type B, QCL type C, or QCL type D; QCL reference signal configuration, which includes a cell ID where a reference signal is located, a BWP ID and an identifier of a reference signal (which may be a CSI-RS resource ID or an SSB index).

The QCL type of at least one QCL information out of QCL information 1 and QCL information 2 must be one of type A, type B, or type C, and the QCL type of the other QCL information (if configured) must be QCL type D.

As an example, available QCL references for PDSCH DMRS may include one of the cases illustrated in Table 1.

TABLE 1

| QCL reference signal configuration 1 | QCL type configuration 1 | QCL reference signal configuration 2 | QCL type configuration 2 |
|---|---|---|---|
| TRS | QCL type A | TRS | QCL type D |
| TRS | QCL type A | CSI-RS for BM | QCL type D |
| CSI-RS for CSI | QCL type A | CSI-RS for CSI | QCL type D |
| SSB | QCL type A | SSB | QCL type D |

3. Method for Determining a QCL Relationship in the NR System

In the NR system, for a CORESET scheduling a PDSCH, if a terminal device is set to "enabled" by a configured higher-layer parameter such as tci-PresentInDCI, the terminal device assumes that a PDCCH corresponding to DCI format 1-1 transmitted in the CORESET includes a TCI field.

If the terminal device receives a downlink DCI scheduling a PDSCH, where the downlink DCI does not include a TCI field, and if a time-domain offset between reception of the DCI and reception of the PDSCH scheduled by the DCI is equal to or greater than a set threshold, for example, time-DurationForQCL, the terminal device assumes that a TCI state or QCL assumption of the PDSCH scheduled by the DCI is the same as a TCI state or QCL assumption of a CORESET transmitting the DCI.

If the terminal device receives a downlink DCI scheduling a PDSCH, where the downlink DCI includes a TCI field, and if a time-domain offset between reception of the DCI and reception of the PDSCH scheduled by the DCI is equal to or greater than a set threshold, for example, timeDuration-ForQCL, the terminal device takes a QCL reference indicated by the TCI field in the received DCI as a QCL reference for the PDSCH scheduled by the DCI. When the terminal device is configured with multi-slot PDSCH transmission, the indicated TCI state should be determined according to a set of TCI state ("TCI-state set" for short) activated in the first slot in the scheduled multi-slot PDSCH, and the terminal device should assume that the TCI-state sets activated on the scheduled PDSCH is the same. In other words, if there are different TCI-state sets activated via MAC CE on the scheduled multi-slot PDSCH, the terminal device shall determine the TCI state according to the activated TCI state set in the first slot and the TCI state indication information in the DCI.

Figure 2A:
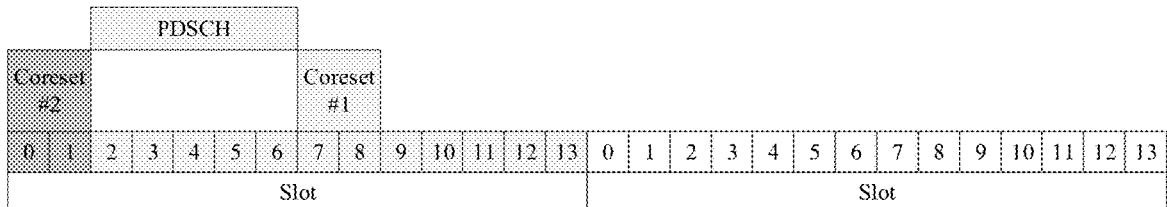
FIG. 2A is a schematic diagram of determining a QCL reference according to a CORESET identifier.

If the terminal device receives a downlink DCI scheduling a PDSCH, and regardless of whether the downlink DCI includes or does not include a TCI field, if a time-domain offset between reception of the DCI and reception of the PDSCH scheduled by the DCI is less than a set threshold, for example, timeDurationForQCL, the terminal device takes a QCL reference corresponding to a CORESET with the smallest ID in CORESETs associated with a search space monitored in the latest slot as a QCL reference for the PDSCH scheduled by the DCI. FIG. 2A gives an example. In FIG. 2A, the QCL reference for the PDSCH is the same as the QCL reference for CORESET #1.

Figure 2B:
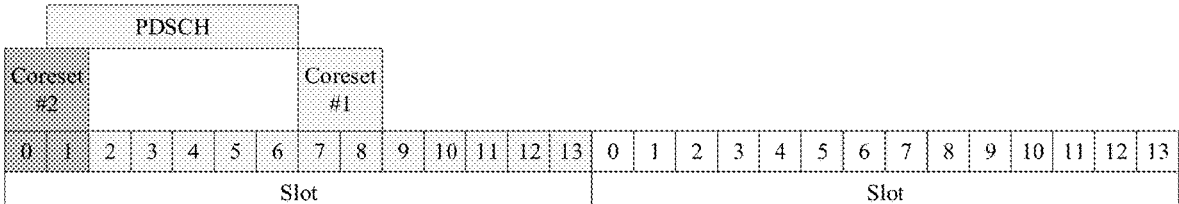
FIG. 2B is a diagram illustrating determination of the first symbol of a physical downlink shared channel (PDSCH) based on beams.

In this case, if the PDSCH and the PDCCH overlap in the time domain over at least one symbol and the "QCL type D" associated with the PDSCH DMRS is different from the "QCL type D" associated with the PDCCH, the terminal device should preferentially receive the PDCCH. In other words, in a case where the time-domain offset between reception of the DCI and reception of the PDSCH scheduled by the DCI is less than a set threshold, for example, timeDurationForQCL, if the PDSCH and the PDCCH overlap in the time domain over at least one symbol, the terminal device may not have correctly decoded the DCI when receiving (caching) the PDSCH, and therefore may not know that the terminal device has been scheduled for PDSCH reception, so that data caching is performed according to the beam direction of the PDCCH. FIG. 2B gives an example in which the first symbol of PDSCH is received (cached) according to the beam corresponding to CORESET #2.

The set threshold is determined according to UE capability reported by the terminal device.

In a high-frequency system, due to a large subcarrier spacing, each slot occupies a short time length. If PDSCH scheduling is performed per slot, just as in the low frequency system, the terminal device will be required to detect PDCCH in each slot, thereby requiring the terminal device to have a stronger processing capability. In order to reduce the requirements on the processing capability of the terminal device, a scheduling method in which one DCI scheduling multiple physical channels may be considered.

Taking downlink transmission as an example, the network device may use one DCI to schedule at least two physical channels such as PDSCH transmission, or use one DCI to activate at least two downlink resources for at least two physical channel transmissions. The at least two downlink resources may belong to the same SPS resource configuration, and may also belong to different SPS resource configurations. The at least two physical channels include a first physical channel and a second physical channel, where the first physical channel and the second physical channel may be used for transmitting different transport blocks (TBs), or the first physical channel and the second physical channel may be used for transmitting the same TB.

Figure 3:
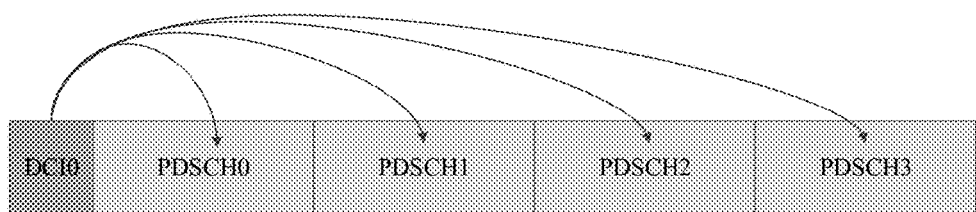
FIG. 3 is a schematic diagram of scheduling multiple PDSCHs by downlink control information (DCI).

As illustrated in FIG. 3, the network device may use DCI 0 to schedule four PDSCH transmissions, including PDSCH 0, PDSCH 1, PDSCH 2 and PDSCH 3. PDSCH 0, PDSCH 1, PDSCH 2 and PDSCH 3 are respectively used for transmitting different TBs.

In high-frequency data transmission, due to large channel fading, beamforming is required to improve the data transmission efficiency. In this scenario, how to determine the QCL relationship of different PDSCHs is a problem to be solved.

Embodiments of the disclosure provide a wireless communication method, a terminal device, and a network device, which can improve high-frequency data transmission efficiency.

Figures 4, 5A, 5B:
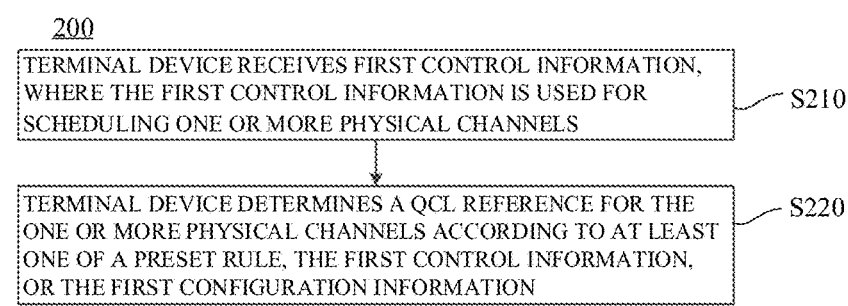
FIG. 4 is a schematic flowchart of a wireless communication method of an embodiment of the disclosure.
FIG. 5A and FIG. 5B are schematic diagrams of examples of time-domain units.

FIG. 4 is a schematic flowchart of a wireless communication method 200 according to an embodiment of the disclosure. The method may optionally be applied to the system illustrated in FIG. 1, but is not limited thereto. The method includes at least part of the following contents.

S210, a terminal device receives first control information, where the first control information is used for scheduling one or more physical channels.

S220, the terminal device determines a QCL reference for the one or more physical channels according to at least one of a preset rule, the first control information, or the first configuration information.

For example, the first control information may be a first DCI. The terminal device receives the first DCI, and the first DCI schedules one or more PDSCHs. The terminal device determines the QCL reference for the one or more PDSCHs according to at least one of a preset rule, the first DCI, or the first configuration information.

In some embodiments, the method further includes the following. The terminal device determines whether a time-domain offset between reception of the first control information and reception of a physical channel among the one or more physical channels is less than a preset threshold.

In some embodiments, the preset threshold is determined according to UE capability reported by the terminal device.

In some embodiments, the preset threshold is configured by the network device. For example, the preset threshold is configured by the network device according to the UE capability reported by the terminal device.

In some embodiments, the method further includes the following. In a case where the time-domain offset between reception of the first control information and reception of a first physical channel among the one or more physical channels is less than a preset threshold, the terminal device determining the QCL reference for the first physical channel according to the preset rule.

For example, if the time-domain offset between the first DCI and the first PDSCH in multiple PDSCHs scheduled by the first DCI is less than a first threshold, the terminal device determines the QCL reference for the first PDSCH according to the preset rule.

In some embodiments, the terminal device determining the QCL reference for the one or more physical channels according to the preset rule includes the following. The terminal device determines the QCL reference for a second physical channel among the one or more physical channels according a QCL reference corresponding to a CORESET in a time-domain unit closest to the second physical channel. It should be noted that the closest time-domain unit includes at least one CORESET.

In some embodiments, the terminal device determining the QCL reference for the second physical channel among the one or more physical channels according to the QCL reference corresponding to the CORESET in the time-domain unit closest to the second physical channel includes one of the following.

The terminal device determines the QCL reference for the second physical channel according to a QCL reference corresponding to a CORESET with the smallest CORESET identifier in the time-domain unit closest to the second physical channel.

The terminal device determines the QCL reference for the second physical channel according to a QCL reference corresponding to the first one of CORESETs in the time-domain unit closest to the second physical channel.

The terminal device determines the QCL reference for the second physical channel according to a QCL reference corresponding to the last one of CORESETs in the time-domain unit closest to the second physical channel.

For example, the terminal device takes the QCL reference corresponding to the CORESET with the smallest ID in the CORESETs associated with the search space monitored in a slot or slot group closest to the second physical channel as the QCL reference for at least one PDSCH in the first PDSCH.

For another example, the terminal device takes the QCL reference corresponding to the earliest CORESET associated with the search space monitored in the latest slot or latest slot group as the QCL reference for at least one PDSCH in the first PDSCH.

For another example, the terminal device takes the QCL reference corresponding to the latest CORESET associated with the search space monitored in the latest slot or latest slot group as the QCL reference for at least one PDSCH in the first PDSCH.

In embodiments of the disclosure, the first physical channel and the second physical channel may be the same physical channel in one or more physical channels scheduled by the first control information, and may also be different physical channels in one or more physical channels scheduled by the first control information.

In some embodiments, the method further includes the following. In a case where a time-domain offset between reception of the first control information and reception of a third physical channel among the one or more physical channels is greater than or equal to a preset threshold, the terminal device determines the QCL reference for the third physical channel according to the first control information and/or the first configuration information.

For example, if the time-domain offset between the first DCI and a third PDSCH among multiple PDSCHs scheduled by the first DCI is greater than or equal to the preset threshold, the terminal device determines the QCL reference for the third PDSCH according to the first DCI.

In another example, if the time-domain offset between the first DCI and the third PDSCH among multiple PDSCHs scheduled by the first DCI is less than the preset threshold, the terminal device determines the QCL reference for the third PDSCH according to the first configuration information.

In embodiments of the disclosure, the first physical channel, the second physical channel, and the third physical channel may be the same physical channel among one or more physical channels scheduled by the first control information, and may also be different physical channels among the one or more physical channels scheduled by the first control information.

In some embodiments, the terminal device determining the QCL reference for the third physical channel according to the first control information includes the following. The terminal device determines the QCL reference for the third physical channel according to transmission configuration indication information in the first control information, where the transmission configuration indication information indicates a QCL reference for a physical channel among the one or more physical channels. Specifically, there can be the following cases.

Case 1: there is one piece of transmission configuration indication information, which indicates the QCL reference (s) for physical channels among the one or more physical channels.

Case 2: there are multiple pieces of transmission configuration indication information, which indicate the QCL reference for each of the one or more physical channels respectively.

In Case 2, a correspondence between the multiple pieces of transmission configuration indication information and multiple physical channels is exemplified as follows.

Correspondence 1: the first one of the multiple pieces of transmission configuration indication information corresponds to the first one of the multiple physical channels.

Correspondence 2: the first one in the multiple pieces of transmission configuration indication information corresponds to the first one of physical channels in the one or more physical channels, where the physical channels satisfy that the time-domain offset between reception of the first control information and reception of the physical channels is greater than or equal to the preset threshold.

In some embodiments, the terminal device determining the QCL reference for the third physical channel according to the first configuration information includes the following. The terminal device determines the QCL reference for the third physical channel according to a QCL reference or a QCL reference set configured in the first configuration information. Specifically, there can be the following cases.

Case 1: there is one QCL reference (or QCL reference set) configured, which indicates the QCL references for physical channels among the one or more physical channels.

Case 2: there are more than one QCL reference (or QCL reference set) configured, which indicate the QCL reference for each of the one or more physical channels respectively.

In Case 2, a correspondence between the multiple QCL references (or QCL reference sets) and multiple physical channels is exemplified as follows.

Correspondence 1: the first one of the multiple QCL references (or QCL reference sets) corresponds to the first one of the multiple physical channels.

Correspondence 2: the first one of the multiple QCL references (or QCL reference sets) corresponds to the first one of physical channels in the one or more physical channels, where the physical channels satisfy that the time-domain offset between reception of the first control information and reception of the physical channels is greater than or equal to the preset threshold.

For example, S TCI states are semi-statically configured according to RRC, and each TCI state corresponds to one QCL reference. For another example, T TCI states are configured according to RRC, and each TCI state corresponds to one QCL reference. For another example, P TCI states are configured according to the MAC CE, and each TCI state corresponds to one QCL reference.

In some embodiments, the terminal device determining the QCL reference for the third physical channel according to the first control information and the first configuration information further includes the following. The terminal device acquires first configuration information, where the first configuration information is used for configuring a QCL reference set for physical channels in the one or more physical channels. The terminal device determines a QCL reference or a QCL reference combination for the third physical channel from the QCL reference set according to the transmission configuration indication information in the first control information and the first configuration information. The terminal device determines the QCL reference for the third physical channel according to the QCL reference or the QCL reference combination for the third physical channel.

Specifically, for the QCL reference set, there may be the following cases.

Case 1: the QCL reference set includes N QCL references, and the transmission configuration indication information is used for determining one QCL reference from the N QCL references.

Case 2: the QCL reference set includes N*M QCL references (for example, N rows and M columns), and the transmission configuration indication information is used for determining M QCL references from the N*M QCL references (for example, the transmission configuration indication information indicates a certain row in the N rows, and then can indicate the M QCL references included in the row).

Further, in Case 2, if M QCL references are determined, a correspondence between the M QCL references and multiple physical channels is exemplified as follows:

Correspondence 1: the first one of the M QCL references corresponds to the first one of the multiple physical channels.

Correspondence 2: the first one of the M QCL references corresponds to the first one of physical channels among the one or more physical channels, where the physical channels satisfy that the time-domain offset between reception of the first control information and reception of the physical channels is greater than or equal to the preset threshold.

In some embodiments, the TCI state indicated in the first DCI corresponds to one TCI state, and the one TCI state may be used for determining a QCL reference for one or more PDSCHs scheduled by the first DCI.

As an example, M TCI states are configured via RRC, and each TCI state corresponds to one QCL reference. A maximum of 8 TCI states are selected from the M TCI states via MAC CE to correspond to 3-bit TCI information in the DCI. If the value of M is less than or equal to 8, the M TCI states correspond to the TCI information in the DCI. One TCI state is selected from the TCI states corresponding to the TCI information in the DCI via DCI, and is taken as the QCL reference for the target reference signal.

In some embodiments, the TCI state indicated in the first DCI corresponds to N TCI states, and the TCI state indicated can be used for determining the QCL reference for one or more PDSCHs scheduled by the first DCI.

As an example, M sets of TCI states are configured via RRC, each set of TCI states includes N TCI states, and each TCI state corresponds to one QCL reference. A maximum of 8 sets of TCI states are selected from the M sets of TCI states via MAC CE to correspond to 3-bit TCI information in the DCI. If the value of M is less than or equal to 8, the M sets of TCI states correspond to the TCI information in the DCI. One set of TCI states is selected from the TCI states corresponding to the TCI information in the DCI via DCI, and is taken as the QCL reference for the target reference signal.

In some embodiments, N is the maximum number of PDSCHs that can be scheduled by the first DCI. For example, in a case where the time-domain offset between the first DCI and the PDSCH scheduled by the first DCI is equal to or greater than a threshold, if the first DCI schedules N PDSCHs, and the TCI information in the first DCI corresponds to N TCI states, the N PDSCHs and the N TCI states are in one-to-one correspondence. For another example, in a case where the time-domain offset between the first DCI and the PDSCH scheduled by the first DCI is equal to or greater than a threshold, if the first DCI schedules K PDSCHs, where K is less than N, and the TCI information in the first DCI corresponds to N TCI states, the K PDSCHs and the first K TCI states in the N TCI states are in one-to-one correspondence.

In some embodiments, the TCI state indicated in the first DCI corresponds to N TCI states, and the maximum number of PDSCHs that can be scheduled by the first DCI is S, where N is less than S. In this case, every ceil (S/N) PDSCHs correspond to one TCI state, where "ceil" represents rounding up.

In some embodiments, the time-domain unit includes one of: one or more slots, a slot group, one or more symbols, a symbol group, one or more subframes, a subframe group, or a half-frame.

For example, the time-domain unit is a time-domain unit determined according to a first subcarrier spacing. The first subcarrier spacing is a predefined, for example, 120 kHz, or the first subcarrier spacing is determined according to a subcarrier spacing of an activated BWP, or the first subcarrier spacing is configured by the network device.

Referring to FIG. 5A, the time-domain unit can be multiple slots or slot groups, and the terminal device can determine the QCL reference for one or more PDSCHs scheduled by the first DCI according to a QCL reference corresponding to a CORESET in the multiple slots or slot groups. Referring to FIG. 5B, the time-domain unit may correspond to a first subcarrier spacing.

In some embodiments, the method further includes the following. In a case where it is determined that a first QCL reference corresponding to a first time-domain resource for the one or more physical channels is different from a second QCL reference corresponding to a second time-domain resource for the one or more physical channels, the terminal device does not transmit (in other words, drop transmitting) on a third time-domain resource between the first time-domain resource and the second time-domain resource.

The third time-domain resource includes at least one of the following cases: the third time-domain resource is a time-domain resource between the first time-domain resource and the second time-domain resource; the third time-domain resource is a part or all of time-domain resources in the first time-domain resource; the third time-domain resource is a part or all of time-domain resources in the second time-domain resource.

In some embodiments, in a case where it is determined that a first beam corresponding to the first time-domain resource is different from a second beam corresponding to the second time-domain resource, the terminal device does not transmit on a third time-domain resource between the first time-domain resource and the second time-domain resource.

The third time-domain resource includes at least one of the following cases: the third time-domain resource is a time-domain resource between the first time-domain resource and the second time-domain resource; the third time-domain resource is a part or all of time-domain resources in the first time-domain resource; the third time-domain resource is a part or all of time-domain resources in the second time-domain resource.

In some embodiments, the first time-domain resource is a time-domain resource corresponding to a first CORESET in a time-domain unit closest to a second physical channel among the one or more physical channels, and the second time-domain resource is a time-domain resource corresponding to a second CORESET in the time-domain unit.

For example, when the terminal device determines that a first QCL reference corresponding to the first CORESET is different from a second QCL reference corresponding to the second CORESET in the time-domain unit, the terminal device does not receive (in other words, drop receiving) on the third time-domain resource between the first CORESET and the second CORESET.

Still another example, when the terminal device determines that a first beam corresponding to the first CORESET is different from a second beam corresponding to the second CORESET in the time-domain unit, the terminal device does not receive on the third time-domain resource between the first CORESET and the second CORESET.

In some embodiments, the first time-domain resource is a resource for transmission of a fourth physical channel among the one or more physical channels, and the second time-domain resource is a resource for transmission of a fifth physical channel among the one or more physical channels.

For example, when the terminal device determines that a first QCL reference corresponding to the fourth physical channel among the one or more physical channels is different from a second QCL reference corresponding to the fifth physical channel among the one or more physical channels, the terminal device does not receive on the third time-domain resource between the fourth physical channel and the fifth physical channel, where the fourth physical channel and the fifth physical channel are continuous in time domain.

Still another example, when the terminal device determines that a first beam corresponding to the fourth physical channel among the one or more physical channels is different from a second beam corresponding to the fifth physical channel among the one or more physical channels, the terminal device does not receive on the third time-domain resource between the fourth physical channel and the fifth physical channel, where the fourth physical channel and the fifth physical channel are continuous in time domain.

In some embodiments, in a case where the time-domain offset between the first DCI and part of the PDSCHs scheduled by the first DCI is equal to or greater than a threshold or in a case where the time-domain offset between the first DCI and part of the PDSCHs scheduled by the first DCI is less than the threshold, the terminal device performs at least one of the following. Determine a QCL reference for a PDSCH, which is less than a threshold, in the PDSCHs scheduled by the first DCI according to a preset rule; determine a QCL reference for a PDSCH, which is equal to or greater than a threshold, in the PDSCHs scheduled by the first DCI according to the TCI state indication information; determine QCL references for all PDCCHs in the PDSCHs scheduled by the first DCI according to the preset rule; or determine QCL references for all PDSCHs in the PDSCHs scheduled by the first DCI according to the TCI state indication information.

In some embodiments, the third time-domain resource includes one or more symbols.

In some embodiments, the first QCL reference is different from the second QCL reference, including: a QCL type D associated with the first QCL reference is different from a QCL type D associated with the second QCL reference.

In some embodiments, the first beam is different from the second beam, including: a QCL type D associated with the first beam is different from a QCL type D associated with the second beam.

In some embodiments, if a slot or a slot group includes downlink receptions, such as CORESET or PDSCH, corresponding to multiple different "QCL type D" references, or CORESET or PDSCH corresponding to multiple different reception beams, the terminal device may reserve a certain gap such as one or more symbols after then end of and/or before the start of the CORESET or PDSCH. Optionally, the reserved gap is configured corresponding to a subcarrier spacing of 960 kHz, which is mainly because the time required for beam switching is about 100 ns, and for a small subcarrier spacing (for example, 60 kHz or 120 kHz), the time for beam switching may be included in a cyclic prefix (CP) of a symbol. However, for a subcarrier spacing of 960 kHzs, the CP of one symbol has a length of only about 70 microseconds, which is not enough for completing beam switching, and therefore it is necessary to reserve a certain gap, for example, one symbol, for beam switching.

In some embodiments, the preset threshold is determined by the terminal device according to the UE capability, and/or the preset threshold is configured by the network device for the terminal device according to the capability report of the terminal device.

In some embodiments, the QCL reference includes: reference signals having a QCL relationship with the physical channels, for example, refer to Table 1 and the related description thereof regarding the QCL relationship in the foregoing NR system.

In some embodiments, the QCL reference associated QCL types includes at least one of: QCL type A, QCL type B, QCL type C, or QCL type D.

In some embodiments, the physical channel includes at least one of the following: PDSCH, or physical sidelink control channel (PSSCH).

In some embodiments, the control information includes at least one of: DCI, or sidelink control information (SCI).

According to the embodiments of the disclosure, the QCL reference for one or more physical channels scheduled by the first control information is determined according to at least one of the preset rule, the first control information, or the first configuration information, so that high-frequency data transmission efficiency can be improved.

FIG. 6 is a schematic flowchart of a wireless communication method 300 according to an embodiment of the disclosure. The method may optionally be applied to the system illustrated in FIG. 1, but is not limited thereto. The method includes at least part of the following contents.

S310, the terminal device does not transmit on a sixth time-domain resource, in a case where it is determined that a third QCL reference corresponding to a fourth time-domain resource is different from a fourth QCL reference corresponding to a fifth time-domain resource. Where the sixth time-domain resource includes at least one of the following cases: the sixth time-domain resource is a time-domain resource between the fourth time-domain resource and the fifth time-domain resource; the sixth time-domain resource is a part or all of time-domain resources in the fourth time-domain resource; or the sixth time-domain resource is a part or all of time-domain resources in the fifth time-domain resource.

In some embodiments, the third QCL reference is different from the fourth QCL reference, including: QCL type D associated with the third QCL reference is different from QCL type D associated with the fourth QCL reference.

In some embodiments, the fourth time-domain resource is continuous with the fifth time-domain resource in a time domain.

In some embodiments, the fourth time-domain resource is a time-domain resource corresponding to a third CORESET, and the fifth time-domain resource is a time-domain resource corresponding to a fourth CORESET.

In some embodiments, the third CORESET and the fourth CORESET are CORESETs in a time-domain unit, and the time-domain unit includes one of: one or more slots, a slot group, one or more symbols, a symbol group, one or more subframes, a subframe group, or a half-frame.

In some embodiments, the fourth time-domain resource is a resource for transmitting a sixth physical channel, and the fifth time-domain resource is a resource for transmitting a seventh physical channel.

In some embodiments, the sixth time-domain resource includes one or more symbols.

In some embodiments, the terminal device does not transmit on a sixth time-domain resource, including the following. The sixth time-domain resource is a downlink time-domain resource, and the terminal device does not receive on the sixth time-domain resource; or, the sixth time-domain resource is an uplink time-domain resource, and the terminal device does not send (in other words, drop sending) on the sixth time-domain resource.

In some embodiments, the terminal device does not transmit on a sixth time-domain resource, including the following. The sixth time-domain resource is a sidelink time-domain resource, the terminal device is a receiving device, and the terminal device does not receive on the sixth time-domain resource; or, the sixth time-domain resource is a sidelink time-domain resource, the terminal device is a sending device, and the terminal device does not send on the sixth time-domain resource.

In some embodiments, the method further includes the following. In a case where it is determined that the third QCL reference corresponding to the fourth time-domain resource is the same as the fourth QCL reference corresponding to the fifth time-domain resource, the terminal device transmits on the sixth time-domain resource.

For solutions related to the method 300 executed by the terminal device in this embodiment, reference may be made to the related description in the foregoing method 200, and for brevity, details are not described herein again.

FIG. 7 is a schematic flowchart of a wireless communication method 400 according to an embodiment of the disclosure. The method may optionally be applied to the system illustrated in FIG. 1, but is not limited thereto. The method includes at least a part of the following contents.

S410, a network device sends first control information for scheduling one or more physical channels, so that a terminal device determines QCL references for the one or more physical channels according to at least one of a preset rule, the first control information, or first configuration information.

In some embodiments, the method further includes the following. The network device sends a preset threshold to the terminal device, where the preset threshold is used for determining, by the terminal device, whether a time-domain offset between reception of the first control information and reception of a physical channel among the one or more physical channels is smaller than the preset threshold.

In some embodiments, the preset threshold is configured for the terminal device by the network device according to capability report of the terminal device.

In some embodiments, the method further includes the following. The network device sends first configuration information to the terminal device, where the first configuration information is used for configuring a QCL reference set for physical channels among the one or more physical channels.

In some embodiments, the QCL reference includes: a reference signal having a QCL relationship with the physical channel.

In some embodiments, a QCL type associated with the QCL reference includes at least one of: QCL type A, QCL type B, QCL type C, or QCL type D.

In some embodiments, the physical channel includes at least one of: a physical downlink shared channel (PDSCH), or a physical downlink shared channel (PSSCH).

In some embodiments, the control information includes at least one of: downlink control information (DCI), or sidelink control information (SCI).

For specific examples related to the method 400 executed by the network device in this embodiment, reference may be made to the network device related description in the foregoing method 200, and for brevity, details are not described herein again.

The following are specific examples.

Example 1

A terminal device determines a QCL reference for at least one PDSCH in the first PDSCH according to a preset rule.

If the terminal device receives a downlink DCI scheduling a PDSCH, and regardless of whether the downlink DCI includes or does not include a TCI field, if a time-domain offset between reception of the DCI and reception of the PDSCH scheduled by the DCI is less than a set threshold, for example, timeDurationForQCL, the terminal device takes a QCL reference corresponding to a CORESET with the smallest ID in CORESETs associated with a search space monitored in the latest slot or the latest slot group as a QCL reference for the PDSCH scheduled by the DCI.

Or, if the terminal device receives a downlink DCI scheduling a PDSCH, and regardless of whether the downlink DCI includes or does not include a TCI field, if a time-domain offset between reception of the DCI and reception of the PDSCH scheduled by the DCI is less than a set threshold, for example, timeDurationForQCL, the terminal device takes a QCL reference corresponding to the first one of CORESETs associated with a search space monitored in the latest slot or the latest slot group as a QCL reference for the PDSCH scheduled by the DCI.

Or, if the terminal device receives a downlink DCI scheduling a PDSCH, and regardless of whether the downlink DCI includes or does not include a TCI field, if a time-domain offset between reception of the DCI and reception of the PDSCH scheduled by the DCI is less than a set threshold, for example, timeDurationForQCL, the terminal device takes a QCL reference corresponding to the last one of CORESETs associated with a search space monitored in the latest slot or the latest slot group as a QCL reference for the PDSCH scheduled by the DCI.

For example, as illustrated in FIG. 8, one slot group includes four slots, and when the terminal device caches the PDSCH, the terminal device caches data according to the QCL reference corresponding to the first one of CORESETs in one slot group. For example, one DCI schedules 4 PDSCHs, and for the former 3 PDSCHs, data is cached according to the QCL reference corresponding to the first one of CORESETs (corresponding to the time period 1) in the first slot group. For the fourth PDSCH, data is cached according to the QCL reference corresponding to the first one of CORESETs of the second slot group (corresponding to the time period 2).

For another example, as illustrated in FIG. 9, when the terminal device caches a PDSCH, the terminal device caches data according to a QCL reference corresponding to a CORESET with the smallest CORESET ID in a slot group. For example, when the terminal device caches the PDSCH, the terminal device caches data according to the QCL reference corresponding to Coreset 1 (including symbols 0 to 6 and 10 to 13) in time period 1 (span 1). When the terminal device caches the PDSCH, the terminal device caches data according to the QCL reference corresponding to Coreset 0 (including symbols 0 to 6 and 10 to 13) in time period 2 (span2).

Figures 10, 11, 12, 13, 14:
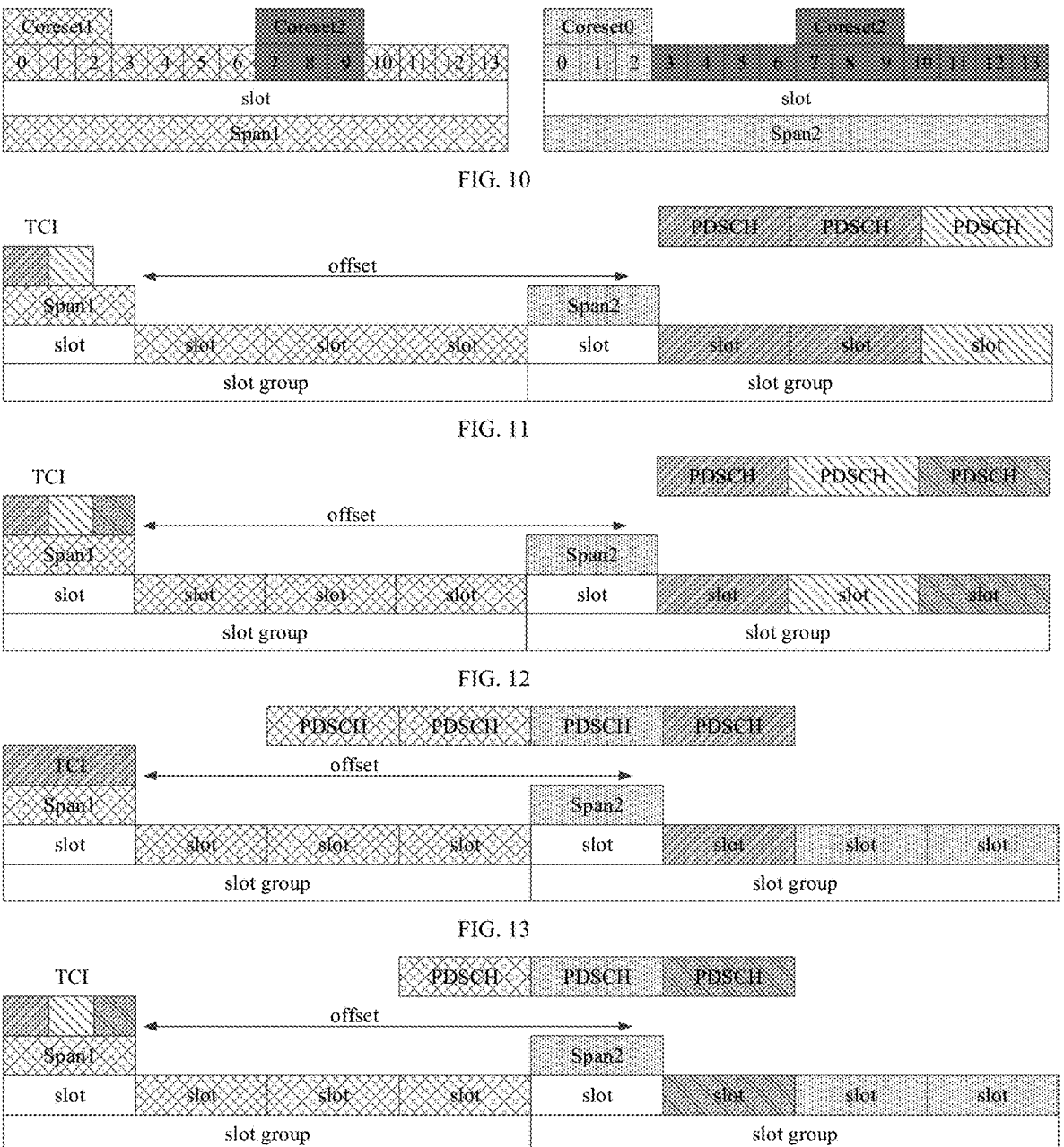
FIG. 10 is a schematic diagram of caching data according to a QCL reference corresponding to the first one or last one of CORESETs in a slot group.
FIG. 11 is a diagram of determining a QCL reference corresponding to a PDSCH according to two transmission configuration indicator (TCI) states.
FIG. 12 is a diagram of determining a QCL reference corresponding to a PDSCH according to three TCI states.
FIG. 13 is a schematic diagram of determining a QCL reference corresponding to a PDSCH according to one TCI state and a threshold.
FIG. 14 is a schematic diagram of determining a QCL reference corresponding to a PDSCH according to three TCI states and thresholds.

For another example, as illustrated in FIG. 10, when a terminal device caches a PDSCH, the terminal device caches data according to a QCL reference corresponding to the first or last CORESET in a slot group. For example, when the terminal device caches the PDSCH, the terminal device caches data according to the QCL reference corresponding to Coreset 1 (including symbols 0 to 6 and 10 to 13) in time period 1 (span 1). When the terminal device caches the PDSCH, the terminal device caches data according to the QCL reference corresponding to Coreset 2 (including symbols 3 to 13) in time period 2 (span2).

Example 2

In a case where the time-domain offset between reception of the DCI and reception of the PDSCH scheduled by the DCI is equal to or greater than a set threshold, for example, timeDurationForQCL, the terminal device determines the QCL reference for at least one PDSCH in the first PDSCH according to the TCI state indication in the DCI.

For example, as illustrated in FIG. 11, the TCI information in the first DCI is used for determining two TCI states, where either of the TCI states corresponds to two PDSCHs. The first DCI schedules three PDSCHs, and the first two PDSCHs among the three PDSCHs correspond to the first TCI state, and the third PDSCH corresponds to the second TCI state. When the terminal device caches the PDSCH, the terminal device determines a QCL reference corresponding to each PDSCH according to the TCI information and caches data. Here, the number of PDSCHs corresponding to each TCI state can be calculated by ceil (S/N). In this example, the maximum number of PDSCHs that can be scheduled by the first DCI is S=3, the number of TCI states is N=2, and ceil(S/N)=2, therefore, each TCI state corresponds to two PDSCH(s).

For another example, as illustrated in FIG. 12, the DCI information in the first DCI is used for determining three TCI states. The first DCI schedules three PDSCHs, where each of the TCI states corresponds to one PDSCH, thus, the first PDSCH of the three PDSCHs corresponds to the first TCI state, the second PDSCH corresponds to the second TCI state, and the third PDSCH corresponds to the third TCI state. When the terminal device caches the PDSCH, the terminal device determines a QCL reference corresponding to each PDSCH according to the TCI information and caches data.

Example 3

In a case where a time-domain offset between the first DCI and part of PDSCHs scheduled by the first DCI is equal to or greater than a threshold or a time-domain offset between the first DCI and part of PDSCHs scheduled by the first DCI is less than the threshold, the terminal device executes at least one of the following. Determine a QCL reference for the PDSCH, which is less than a threshold, in the first PDSCH according to a preset rule; determine a QCL reference for the PDSCH, which is equal to or greater than a threshold, in the first PDSCH according to the TCI state indication information; determine QCL references for all PDCCHs in the PDSCHs scheduled by the first DCI according to the preset rule; or determine QCL references for all PDSCHs in the PDSCHs scheduled by the first DCI according to the TCI state indication information.

For example, as illustrated in FIG. 13, the DCI information in the first DCI is used for determining one TCI state. The first DCI schedules four PDSCHs, where the first three PDSCHs among the four PDSCHs are within a threshold, and the fourth PDSCH is beyond the threshold. When the terminal device caches a PDSCH, the terminal device determine QCL references for the first three PDSCHs according to a preset rule and caches data, and determines a QCL reference corresponding to the fourth PDSCH according to the TCI information and caches data.

For another example, as illustrated in FIG. 14, the DCI information in the first DCI is used for determining three TCI states. The first DCI schedules three PDSCHs, with each TCI state corresponds to one PDSCH, thus, among the three PDSCHs, the first PDSCH corresponds to the first TCI state, the second PDSCH corresponds to the second TCI state, and the third PDSCH corresponds to the third TCI state. The first two PDSCHs among the three PDSCHs are within a threshold, and the third PDSCH is beyond the threshold. When the terminal device caches the PDSCHs, the terminal device determines QCL references for the first three PDSCHs according to a preset rule and caches data, and determines a QCL reference corresponding to the third PDSCH according to the third TCI state in the TCI information and caches data.

Example 4

When the beam is switched for data receiving (or caching), a certain gap needs to be reserved for beam switching.

For example, as illustrated in FIG. 15, for a subcarrier spacing of 960 kHz, if a slot or a slot group includes a CORESET corresponding to multiple different "QCL type D" references or a CORESET corresponding to multiple different received beams, the terminal device may reserve a certain gap (for example, one symbol) after the start of and/or before the end of the CORESET. Specifically, receiving is not performed on symbol 3 and symbol 13 in time period 1 (span1) of FIG. 15, or receiving is not performed on symbol 6 and symbol 10 in time period 2 (span2) of FIG. 15.

As another example, as illustrated in FIG. 16, if a slot or a slot group includes a CORESET corresponding to multiple different "QCL type D" references, or a CORESET corresponding to multiple different received beams, the terminal device may reserve a certain gap (for example, one symbol) after the end of and/or before the start of the CORESET.

Specifically, receiving is not performed on the last symbol or symbols in the first slot group in FIG. 16, and if the terminal device is scheduled for PDSCH transmission, receiving is not performed on the corresponding PDSCH symbol either.

In the high-frequency system, by means of the solutions in the disclosure, in a case where the network device schedules one or more PDSCHs transmissions with one DCI, the terminal device can determine the QCL reference corresponding to the at least two PDSCH transmissions, thereby improving the high-frequency data transmission efficiency.

FIG. 17 is a schematic block diagram of a terminal device 20 according to an embodiment of the disclosure, where the terminal device 20 may include a receiving unit 21 and a processing unit 22.

The receiving unit 21 is configured to receive first control information, wherein the first control information is used for scheduling one or more physical channels; the processing unit 22 is configured to determine a quasi-co-location (QCL) reference for the one or more physical channels according to at least one of a preset rule, the first control information, or first configuration information.

In some embodiments, the processing unit is further configured to determine whether a time-domain offset between reception of the first control information and reception of a physical channel among the one or more physical channels is less than a preset threshold.

In some embodiments, the processing unit is further configured to determine the QCL reference for a first physical channel among the one or more physical channels according to the preset rule, in a case where the time-domain offset between reception of the first control information and reception of the first physical channel is less than the preset threshold.

In some embodiments, the processing unit configured to determine the QCL reference for the one or more physical channels according to the preset rule is configured to: determine the QCL reference for a second physical channel among the one or more physical channels according to a QCL reference corresponding to a CORESET in a time-domain unit closest to the second physical channel.

In some embodiments, the processing unit configured to determine the QCL reference for the second physical channel among the one or more physical channels according to the QCL reference corresponding to the CORESET in the time-domain unit closest to the second physical channel is configured to: determine the QCL reference for the second physical channel according to a QCL reference corresponding to a CORESET with a smallest CORESET identifier in the time-domain unit closest to the second physical channel; determine the QCL reference for the second physical channel according to a QCL reference corresponding to the first one of CORESETs in the time-domain unit closest to the second physical channel; or determine the QCL reference for the second physical channel according to a QCL reference corresponding to the last one of CORESETs in the time-domain unit closest to the second physical channel.

In some embodiments, the processing unit is further configured to: determine the QCL reference for a third physical channel among the one or more physical channels according to the first control information and/or the first configuration information, in a case where a time-domain offset between reception of the first control information and reception of the third physical channel is greater than or equal to the preset threshold.

In some embodiments, the processing unit configured to determine the QCL reference for the third physical channel according to the first control information is configured to: determine the QCL reference for the third physical channel according to transmission configuration indication information in the first control information; wherein the transmission configuration indication information indicates a QCL reference(s) for physical channels among the one or more physical channels.

In some embodiments, the processing unit configured to determine the QCL reference for the third physical channel according to the first configuration information is configured to: determine the QCL reference for the third physical channel according to a QCL reference or a QCL reference set configured in the first configuration information.

In some embodiments, the processing unit configured to determine the QCL reference for the third physical channel according to the first control information and the first configuration information is configured to: acquire first configuration information, where the first configuration information is used for configuring a QCL reference set for physical channels among the one or more physical channels; determine a QCL reference or a QCL reference combination for the third physical channel in the QCL reference set according to the transmission configuration indication information in the first control information and the first configuration information; determine the QCL reference for the third physical channel according to the QCL reference or the QCL reference combination for the third physical channel.

In some embodiments, the time-domain unit includes one of: one or more slots, a slot group, one or more symbols, a symbol group, one or more subframes, a subframe group, or a half-frame.

In some embodiments, the processing unit is further configured to: not transmit on a third time-domain resource between a first time-domain resource and a second time-domain resource, in a case where a first QCL reference corresponding to the first time-domain resource for the one or more physical channels is different from a second QCL reference corresponding to the second time-domain resource for the one or more physical channels.

Where the third time-domain resource includes at least one of the following cases. The third time-domain resource is a time-domain resource between the first time-domain resource and the second time-domain resource; the third time-domain resource is a part or all of time-domain resources in the first time-domain resource; or the third time-domain resource is a part or all of time-domain resources in the second time-domain resource.

In some embodiments, the first time-domain resource is a time-domain resource corresponding to a first CORESET in the time-domain unit closest to the second physical channel among the one or more physical channels, and the second time-domain resource is a time-domain resource corresponding to a second CORESET in the time-domain unit.

In some embodiments, the first time-domain resource is a resource for transmission of a fourth physical channel among the one or more physical channels, and the second time-domain resource is a resource for transmission of a fifth physical channel among the one or more physical channels.

In some embodiments, the third time-domain resource includes one or more symbols.

In some embodiments, the first QCL reference is different from the second QCL reference, including: QCL type D associated with the first QCL reference is different from QCL type D associated with the second QCL reference.

In some embodiments, the preset threshold is determined by the terminal device according to UE capability, and/or the preset threshold is configured by the network device for the terminal device according to capability report of the terminal device.

In some embodiments, the QCL reference includes a reference signal having a QCL relationship with the physical channel.

In some embodiments, a QCL type associated with the QCL reference includes at least one of: QCL type A, QCL type B, QCL type C, or QCL type D.

In some embodiments, the physical channel includes at least one of a physical downlink shared channel (PDSCH), or a physical sidelink shared channel (PSSCH).

In some embodiments, the control information includes at least one of downlink control information (DCI) and sidelink control information (SCI).

The terminal device 20 in the embodiments of the disclosure can implement corresponding functions of the terminal device in the foregoing method 200 embodiment. For a procedure, a function, an implementation, and beneficial effects corresponding to each module (a sub-module, a unit, or a component) in the terminal device 20, reference may be made to the corresponding description in the foregoing method embodiment, and details are not repeatedly described herein. It should be noted that the functions described with respect to respective modules (sub-modules, units or components, etc.) in the terminal device 20 in the embodiments of the disclosure may be implemented by different modules (sub-modules, units or components, etc.), or may be implemented by the same module (sub-modules, units or components, etc.).

FIG. 18 is a schematic block diagram of a terminal device 30 according to an embodiment of the disclosure. The terminal device 30 includes a processing unit.

The processing unit 31 is configured to not transmit on a sixth time-domain resource, in a case where a third quasi-co-location (QCL) reference corresponding to a fourth time-domain resource is different from a fourth QCL reference corresponding to a fifth time-domain resource. The sixth time-domain resource includes at least one of the following cases: the sixth time-domain resource is a time-domain resource between the fourth time-domain resource and the fifth time-domain resource; the sixth time-domain resource is a part or all of time-domain resources in the fourth time-domain resource; or the sixth time-domain resource is a part or all of time-domain resources in the fifth time-domain resource.

In some embodiments, the third QCL reference is different from the fourth QCL reference, including: QCL type D associated with the third QCL reference is different from QCL type D associated with the fourth QCL reference.

In some embodiments, the fourth time-domain resource is continuous with the fifth time-domain resource in a time domain.

In some embodiments, the fourth time-domain resource is a time-domain resource corresponding to a third control resource set (CORESET), and the fifth time-domain resource is a time-domain resource corresponding to a fourth CORESET.

In some embodiments, the third CORESET and the fourth CORESET are CORESETs in a time-domain unit. The time-domain unit includes one of: one or more slots, a slot group, one or more symbols, a symbol group, one or more subframes, a subframe group, or a half-frame.

In some embodiments, the fourth time-domain resource is a resource for transmitting a sixth physical channel, and the fifth time-domain resource is a resource for transmitting a seventh physical channel.

In some embodiments, the sixth time-domain resource includes one or more symbols.

In some embodiments, the processing unit configured to not transmit on the sixth time-domain resource is configured to: not receive on the sixth time-domain resource, where the sixth time-domain resource is a downlink time-domain resource; or, not send on the sixth time-domain resource, where the sixth time-domain resource is an uplink time-domain resource.

In some embodiments, the processing unit configured to not transmit on the sixth time-domain resource is configured to: not receive on the sixth time-domain resource, where the sixth time-domain resource is a sidelink time-domain resource, and the terminal device is a receiving device; not send on the sixth time-domain resource, wherein the sixth time-domain resource is a sidelink time-domain resource, and the terminal device is a sending device.

In some embodiments, the processing unit is further configured to: transmit on the sixth time-domain resource, in a case where the third QCL reference corresponding to the fourth time-domain resource is the same as the fourth QCL reference corresponding to the fifth time-domain resource.

The terminal device 30 in the embodiments of the disclosure can implement corresponding functions of the terminal device in the foregoing method 300 embodiment. For a procedure, a function, an implementation, and beneficial effects corresponding to each module (a sub-module, a unit, or a component) in the terminal device 30, reference may be made to the corresponding description in the foregoing method embodiment, and details are not repeatedly described herein. It should be noted that the functions described with respect to respective modules (sub-modules, units or components, etc.) in the terminal device 30 in the embodiments of the disclosure may be implemented by different modules (sub-modules, units or components, etc.), or may be implemented by the same module (sub-modules, units or components, etc.).

FIG. 19 is a schematic block diagram of a network device 40 according to an embodiment of the disclosure. The network device 40 includes a sending unit 41.

The sending unit 41 is configured to send first control information used for scheduling one or more physical channels, so that a terminal device determines a quasi-co-location (QCL) reference for the one or more physical channels according to at least one of a preset rule, the first control information, and first configuration information.

In some embodiments, the sending unit is further configured to send a preset threshold to the terminal device, wherein the preset threshold is used for determining, by the terminal device, whether a time-domain offset between reception of the first control information and reception of a physical channel among the one or more physical channels is smaller than the preset threshold.

In some embodiments, the preset threshold is configured for the terminal device by the network device according to capability report of the terminal device.

In some embodiments, the sending unit is further configured to send first configuration information to the terminal device, where the first configuration information is used for configuring a QCL reference set for physical channels among the one or more physical channels.

In some embodiments, the QCL reference includes a reference signal having a QCL relationship with the physical channel.

In some embodiments, a QCL type associated with the QCL reference includes at least one of: QCL type A, QCL type B, QCL type C, or QCL type D.

In some embodiments, the physical channel includes at least one of a physical downlink shared channel (PDSCH), or a physical sidelink shared channel (PSSCH).

In some embodiments, the control information includes at least one: downlink control information (DCI), or sidelink control information (SCI).

The network device 40 in the embodiments of the disclosure can implement corresponding functions of the terminal device in the foregoing method 400 embodiment. For a procedure, a function, an implementation, and beneficial effects corresponding to each module (a sub-module, a unit, or a component) in the network device 40, reference may be made to the corresponding description in the foregoing method embodiment, and details are not repeatedly described herein. It should be noted that the functions described with respect to respective modules (sub-modules, units or components, etc.) in the network device 40 in the embodiments of the disclosure may be implemented by different modules (sub-modules, units or components, etc.), or may be implemented by the same module (sub-modules, units or components, etc.).

Figure 20:
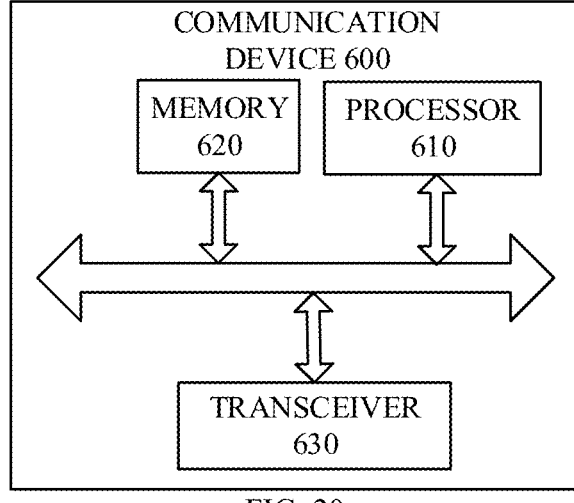
FIG. 20 is a schematic block diagram of a communication device according to an embodiment of the disclosure.

FIG. 20 is a schematic structural diagram of a communication device 600 according to an embodiment of the disclosure. The communication device 600 includes a processor 610, and the processor 610 can invoke and run a computer program from a memory, so that the communication device 600 implements the method in the embodiments of the disclosure.

Optionally, the communication device 600 can further include a memory 620, where the processor 610 can invoke and run a computer program from the memory 620, so that the communication device 600 implements the method in the embodiments of the disclosure.

The memory 620 may be a separate component independent of the processor 610, and may also be integrated in processor 610.

Optionally, the communication device 600 can further include a transceiver 630. The processor 610 can control the transceiver 630 to communicate with other devices, and specifically, can send information or data to other devices or receive information or data sent by other devices.

The transceiver 630 may include a transmitter and a receiver. The transceiver 630 can further include one or more antennas.

Optionally, the communication device 600 may be the network device according to the embodiments of the disclosure, and the communication device 600 can implement corresponding processes implemented by the network device in the methods according to the embodiments of the disclosure. For brevity, details are not described herein again.

Optionally, the communication device 600 may be the terminal device according to an embodiments of the disclosure, and the communication device 600 can implement corresponding processes implemented by the terminal device in various methods according to the embodiments of the disclosure. For brevity, details are not described herein again.

Figure 21:
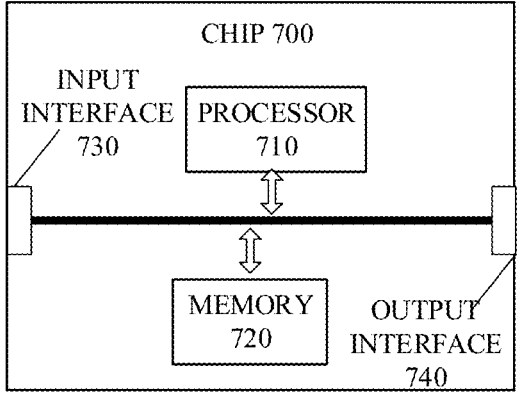
FIG. 21 is a schematic block diagram of a chip according to an embodiment of the disclosure.

FIG. 21 is a schematic structural diagram of a chip 700 according to an embodiment of the disclosure. The chip 700 includes a processor 710. The processor 710 can invoke and run a computer program from a memory to implement the method in the embodiments of the disclosure.

Optionally, the chip 700 can further include a memory 720. The processor 710 can invoke and run a computer program from the memory 720 to implement the method executed by the terminal device or the network device in the embodiments of the disclosure.

The memory 720 may be a separate component independent of the processor 710, and may also be integrated in the processor 710.

Optionally, the chip 700 can further include an input interface 730. The processor 710 can control the input interface 730 to communicate with other devices or chips, and specifically, can acquire information or data sent by other devices or chips.

Optionally, the chip 700 can further include an output interface 740. The processor 710 may control the output interface 740 to communicate with other devices or chips, and specifically, may output information or data to other devices or chips.

Alternatively, the chip may be applied to the network device in the embodiments of the disclosure, and the chip may implement a corresponding process implemented by the network device in each method in the embodiments of the disclosure, which is not described herein again for brevity.

Alternatively, the chip may be applied to the terminal device in the embodiments of the disclosure, and the chip may implement a corresponding process implemented by the terminal device in each method in the embodiments of the disclosure, which is not described herein again for brevity.

The chips applied to the network device and the terminal device may be the same chip or different chips.

It should be understood that the chip mentioned in the embodiments of the disclosure may also be referred to as a system-level-chip, a system chip, a chip system, a system-on-chip, or the like.

The foregoing processor may be a general processor, a digital signal processor (DSP), a field programmable gate array (FPGA), an application specific integrated circuit (ASIC), or another programmable logic device, a transistor logic device, a discrete hardware component, or the like. The general processor may be a microprocessor or any conventional processor.

The memory mentioned above may be transitory memory or non-transitory memory, or may include both volatile and non-transitory memory. The non-transitory memory may be a read-only memory (ROM), a programmable ROM (PROM), an erasable PROM (EPROM), an electrically erasable PROM (EEPROM), or a flash memory. The transitory memory may be a random access memory (RAM).

It should be understood that the foregoing memories are exemplary but not limitative descriptions. For example, the memories in the embodiments of the disclosure may also be static random access memories (static RAM, SRAM), dynamic random access memory (dynamic RAM, DRAM), synchronous dynamic random access memory (synchronous DRAM, SDRAM), double data rate synchronous dynamic random access memory (double data rate SDRAM, DDR SDRAM), an enhanced SDRAM (ESDRAM), and a synchronous link DRAM (SLDRAM), and a direct Rambus RAM (DR RAM), etc. That is to say, the memory in the embodiments of the disclosure is intended to include, but not limited to, these and any other suitable types of memory.

Figure 22:
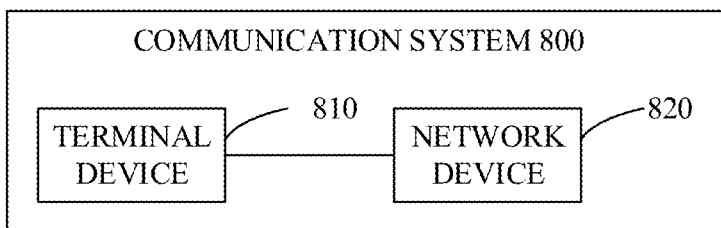
FIG. 22 is a schematic block diagram of a communication system according to an embodiment of the disclosure.

FIG. 22 is a schematic block diagram of a communication system 800 according to an embodiment of the disclosure, where the communication system 800 includes a terminal device 810 and a network device 820.

The terminal device 810 is configured to: receive first control information, where the first control information is used for scheduling one or more physical channels; determine a QCL reference for the one or more physical channels according to at least one of a preset rule, the first control information, and first configuration information.

The network device 820 is configured to send first control information used for scheduling one or more physical channels.

The terminal device 810 may be configured to implement corresponding functions implemented by the terminal device in the foregoing method, and the network device 820 may be configured to implement corresponding functions implemented by the network device in the foregoing method. For brevity, details are not described herein again.

The embodiments described above may be implemented in whole or in part by software, hardware, firmware, or any combination thereof. When implemented using software, it may be implemented in whole or in part in the form of a computer program product including one or more computer instructions. When the computer program instruction is loaded and executed on the computer, a procedure or function according to the embodiments of the disclosure is completely or partially generated. The computer may be a general purpose computer, a special purpose computer, a computer network, or other programmable apparatus. The computer instructions may be stored on or transmitted from one computer-readable storage medium to another. For example, the computer instructions may be from a website, computer, server, or data center through wireline (e. g., coaxial cable, fiber optics, Digital Subscriber Line), DSL) or wireless (e. g., infrared, wireless, microwave, etc.) transmission to another website, computer, server, or data center. The computer readable storage medium may be any available medium that can be accessed by a computer, or a data storage device such as a server, a data center, or the like that includes one or more available media arrays. The useable medium may be a magnetic medium, (e. g., floppy disk, hard disk, magnetic tape), an optical medium (e. g., DVD), or a semiconductor medium (e. g., solid state disk (SSD)), or the like.

It should be understood that, in various embodiments of the disclosure, a sequence number of each of the foregoing processes does not imply an execution sequence, and an execution sequence of each of the processes should be determined according to a function and an internal logic thereof, which should not constitute any limitation to an implementation process of the embodiments of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

The foregoing descriptions are merely specific implementations of the disclosure, but are not intended to limit the scope of protection of the disclosure. Any variation or replacement readily figured out by a person skilled in the art within the technical scope disclosed in the disclosure shall belong to the scope of protection of the disclosure. Therefore, the scope of protection of the disclosure should be subject to the scope of protection of this claim.

What is claimed is:

1. A terminal device, comprising:
a transceiver;
a processor; and
a memory storing computer programs which, when executed by the processor, are operable with the processor to:

28 cause the transceiver to receive first control information, wherein the first control information is used for scheduling one or more physical channels; and determine a quasi-co-location (QCL) reference for a third physical channel among the one or more physical channels according to the first control information and/or first configuration information, in response to a time-domain offset between reception of the first control information and reception of the third physical channel being greater than or equal to a preset threshold.

2. The terminal device of claim 1, wherein the processor is further configured to:

determine the QCL reference for a first physical channel among the one or more physical channels according to a preset rule, in response to a time-domain offset between reception of the first control information and reception of the first physical channel is being less than a preset threshold.

3. The terminal device of claim 2, wherein the processor configured to determine the QCL reference for the one or more physical channels according to the preset rule is configured to:

determine the QCL reference for a second physical channel among the one or more physical channels according to a QCL reference corresponding to a control resource set (CORESET) in a time-domain unit closest to the second physical channel.

4. The terminal device of claim 3, wherein the processor configured to determine the QCL reference for the second physical channel among the one or more physical channels according to the QCL reference corresponding to the CORESET in the time-domain unit closest to the second physical channel is configured to:

determine the QCL reference for the second physical channel according to a QCL reference corresponding to a CORESET with a smallest CORESET identifier in the time-domain unit closest to the second physical channel;

determine the QCL reference for the second physical channel according to a QCL reference corresponding to a first one of CORESETs in the time-domain unit closest to the second physical channel; or determine the QCL reference for the second physical channel according to a QCL reference corresponding to a last one of CORESETs in the time-domain unit closest to the second physical channel.

5. The terminal device of claim 1, wherein at least one of:
the processor configured to determine the QCL reference for the third physical channel according to the first control information is configured to:

determine the QCL reference for the third physical channel according to transmission configuration indication information in the first control information;

wherein the transmission configuration indication information indicates a QCL reference for physical channels among the one or more physical channels; or the processor configured to determine the QCL reference for the third physical channel according to the first configuration information is configured to:

determine the QCL reference for the third physical channel according to a QCL reference or a QCL reference set configured in the first configuration information.

6. The terminal device of claim 1, wherein the processor configured to determine the QCL reference for the third physical channel according to the first control information and the first configuration information is further configured to:

acquire the first configuration information, wherein the first configuration information is used for configuring a QCL reference set for physical channels among the one or more physical channels;

determine a QCL reference or a QCL reference combination for the third physical channel in the QCL reference set according to the transmission configuration indication information in the first control information and the first configuration information; and determine the QCL reference for the third physical channel according to the QCL reference or the QCL reference combination for the third physical channel.

7. The terminal device of claim 1, wherein the processor is further configured to:

cause the transceiver to drop transmitting on a third time-domain resource between a first time-domain resource and a second time-domain resource, in a case where a first QCL reference corresponding to the first time-domain resource for the one or more physical channels is different from a second QCL reference corresponding to the second time-domain resource for the one or more physical channels, wherein at least one of:

the third time-domain resource is a time-domain resource between the first time-domain resource and the second time-domain resource;

the third time-domain resource is a part or all of time-domain resources in the first time-domain resource; and the third time-domain resource is a part or all of time-domain resources in the second time-domain resource.

8. The terminal device of claim 7, wherein the first time-domain resource is a time-domain resource corresponding to a first CORESET in a time-domain unit closest to the second physical channel among the one or more physical channels, and the second time-domain resource is a time-domain resource corresponding to a second CORESET in the time-domain unit.

9. The terminal device of claim 7, wherein the first time-domain resource is a resource for transmission of a fourth physical channel among the one or more physical channels, and the second time-domain resource is a resource for transmission of a fifth physical channel among the one or more physical channels.

10. The terminal device of claim 7, wherein the first QCL reference being different from the second QCL reference comprises:

QCL type D associated with the first QCL reference being different from QCL type D associated with the second QCL reference.

11. The terminal device of claim 1, wherein the QCL reference comprises:

a reference signal having a QCL relationship with the physical channel.

12. The terminal device of claim 1, wherein at least one of:

the physical channel comprises at least one of: a physical downlink shared channel (PDSCH), or a physical sidelink shared channel (PSSCH); and the control information comprises at least one of: downlink control information (DCI), or sidelink control information (SCI).

13. A terminal device, comprising:

a transceiver;

a processor; and a memory storing computer programs which, when executed by the processor, are operable with the processor to:

cause the transceiver to drop transmitting on a sixth time-domain resource, in a case where a third quasi-co-location (QCL) reference corresponding to a fourth time-domain resource is different from a fourth QCL reference corresponding to a fifth time-domain resource, wherein at least one of:

the sixth time-domain resource is a time-domain resource between the fourth time-domain resource and the fifth time-domain resource;

the sixth time-domain resource is a part or all of time-domain resources in the fourth time-domain resource; and the sixth time-domain resource is a part or all of time-domain resources in the fifth time-domain resource.

14. The terminal device of claim 13, wherein the fourth time-domain resource and the fifth time-domain resource are continuous in time domain.

15. The terminal device of claim 13, wherein the fourth time-domain resource is a time-domain resource corresponding to a third control resource set (CORESET), and the fifth time-domain resource is a time-domain resource corresponding to a fourth CORESET, wherein the third CORESET and the fourth CORESET are CORESETs in a time-domain unit, and the time-domain unit comprises one of:

one or more slots, a slot group, one or more symbols, a symbol group, one or more subframes, a subframe group, and a half-frame.

16. The terminal device of claim 13, wherein the fourth time-domain resource is a resource for transmission of a sixth physical channel, and the fifth time-domain resource is a resource for transmission of a seventh physical channel.

17. A network device, comprising:

a transceiver;

a processor; and a memory storing computer programs which, when executed by the processor, are operable with the processor to:

cause the transceiver to send first control information for scheduling one or more physical channels, so that a terminal device determines a quasi-co-location (QCL) reference for a physical channel among the one or more physical channels according to the first control information and/or first configuration information, in response to a time-domain offset between reception of the first control information and reception of the physical channel being greater than or equal to a preset threshold.

18. The network device of claim 17, wherein the processor is further configured to:

cause the transceiver to send a preset threshold to the terminal device, wherein the preset threshold is used for determining, by the terminal device, whether a time-domain offset between reception of the first control information and reception of the physical channel among the one or more physical channels is smaller than the preset threshold, wherein the preset threshold is configured for the terminal device by the network device according to capability report of the terminal device.

19. The network device of claim 17, wherein the processor is further configured to:

cause the transceiver to send the first configuration information to the terminal device, wherein the first configuration information is used for configuring a QCL reference set for physical channels among the one or more physical channels.

\* \* \* \* \*